United States Patent [19]

Yokoyama

[11] Patent Number: 4,459,815
[45] Date of Patent: Jul. 17, 1984

[54] AIR CONDITIONER

[75] Inventor: Seishi Yokoyama, Nagasaki, Japan

[73] Assignee: Mitsubishi Denki Kabushiki Kaisha, Tokyo, Japan

[21] Appl. No.: 366,416

[22] Filed: Apr. 7, 1982

[30] Foreign Application Priority Data

Apr. 7, 1981 [JP] Japan .................................. 56-53478

[51] Int. Cl.³ ...................... F25D 17/00; F25B 47/00; G05D 23/00; E03B 7/10
[52] U.S. Cl. ........................................ 62/180; 62/126; 62/156; 62/185; 62/228.5; 62/201; 236/1 EA; 236/91 D; 236/91 R; 237/80
[58] Field of Search ................. 62/180, 155, 156, 234, 62/185, 201, 125, 126, 127, 128, 129, 130; 237/80; 236/1 EA, 91 R, 49, 91 D; 165/22

[56] References Cited

U.S. PATENT DOCUMENTS

| | | | |
|---|---|---|---|
| 4,023,947 | 5/1977 | Ferry | 236/49 |
| 4,089,462 | 5/1978 | Bradford | 236/91 R |
| 4,151,723 | 5/1979 | Gardner | 62/156 |
| 4,215,554 | 8/1980 | Pohl | 62/156 |
| 4,325,223 | 4/1982 | Cantley | 62/127 |
| 4,338,791 | 7/1982 | Stamp, Jr. et al. | 236/1 EA |

FOREIGN PATENT DOCUMENTS

| | | |
|---|---|---|
| 45-1977 | 1/1970 | Japan . |
| 45-40613 | 12/1970 | Japan . |
| 52-54253 | 5/1977 | Japan .................................. 237/80 |
| 55-5024 | 2/1980 | Japan . |
| 1553217 | 9/1979 | United Kingdom ............ 236/1 EA |

Primary Examiner—Albert J. Makay
Assistant Examiner—Harry Tanner
Attorney, Agent, or Firm—Wenderoth, Lind & Ponack

[57] ABSTRACT

An air conditioner includes a plurality of refrigerant compressors, a plurality of ventilating fans and a cooling/warming water pump which is controlled by both a memory and a contact-less control unit in accordance with an outdoor temperature and a refrigerant temperature which are sensed by associated temperature sensors. Alternatively, the control unit may be connected to both protective devices disposed on the fans, the compressors, the pump, etc. and further connected to a digital indicator which indicates the operating status of the air conditioner.

2 Claims, 11 Drawing Figures

AIR CONDITIONER

BACKGROUND OF THE INVENTION

This invention relates to improvements in an air conditioner.

The conventional type of air conditioner has comprised a plurality of electromagnetic relays and timers combined therewith to control the components involved, a plurality of the thermostats for controlling temperatures one for each of serves, and a plurality of indicating lamps for respectively indicating associated control operations. Thus, a sequence control using contacts has been effected. As a result, malfunctions have frequently occurred due to the burning of the electromagnetic coils involved, the fusion welding and poor engagement of contacts, etc. Furthermore, the sequence control with the previously employed contacts has been principally utilized to control air conditioners which are in operation, but it has been difficult to control the judging functions, air conditioners, which are not in operation, the rotational operation of refrigerant compressors and ventilating fans, etc.

Also, there have been already known air conditioners comprising means for indicating the modes of operation thereof. However, such air conditioners have not been provided with temperature indicators because it is difficult to indicate temperatures.

SUMMARY OF THE INVENTION

Accordingly, it is an object of the present invention to provide an air conditioner comprising a new and improved contactless control means for controlling the same not only during operation but also automating the control thereof during the non-operation thereof so as to thereby prevent the occurrence of malfunctions previously developed with conventional control means using contacts.

It is another object of the present invention to provide the control means of the type described in the preceding paragraph and further enabled to effect the control of the air conditioner which has been impossible to be effected by the conventional control means using contacts.

The present invention provides an air conditioner comprising a main body including a plurality of ventilating fans, a plurality of refrigerant compressors and a pump; a first means for successively starting the ventilating fans and the refrigerant compressors; a second means for sensing a cooling/warming water temperature, and for effecting a volume control by changing the number of the compressors put in operation in accordance with the sensed water temperature and for performing the rotational operation of the compressors in order to level differences in operating times of the compressors due to the volume control so as to thereby prevent the compressors from being operated in short cycles; a third means for sensing an outdoor temperature and for changing the number of the ventilating fans in response to the sensed outdoor temperature; a fourth means for sensing frost attached to an air coil means by measuring both an outdoor temperature and a refrigerant temperature and for completing the defrosting operation; a fifth means which is responsive to a command suspension signal to suspend, the operation of the air conditioner after the completion of the defrosting operation; and a sixth means for sensing an outdoor temperature and a cooling/warming water temperature during the suspension of the operation the air conditioner and for operating the pump and for suspending the operation of the pump in response to the sensed temperatures so as thereby prevent the pump and its associated water piping from freezing.

The present invention also provides an air conditioner comprising a main body including a plurality of ventilating fans, a plurality of refrigerant compressors and a pump; a first means for successively starting the ventilating fans and refrigerant compressors; a second means for sensing a cooling/warming water temperature, and for controlling the rotational operation of the refrigerant compressors and ventilating fans by changing the number of compressors and fans put in operation in accordance with the sensed water temperature in order to minimize differences in operating times of the compressors and fans due to a volume control, so as to thereby prevent the compressors and fans from being operated in short cycles; a third means for sensing if frost is attached to air coil means in the winter by sensing both an outdoor temperature and a refrigerant temperature and for separately operating a plurality of refrigerant circuits so as to complete the defrosting operation; a fourth means which is responsive to a command suspension signal to suspend the air conditioner in the winter after the completion of the defrosting operation; a fifth means for digitally indicating the modes in which the air conditioner is respectively operated and the failure mode of the air conditioner; a sixth means for sensing an outdoor temperature, the sixth means being responsive to an outdoor temperature which is not higher than a predetermined set magnitude in the room cooling mode of operation so as to raise a set magnitude to a thermostat for cooling water at will and which is responsive to an outdoor temperature not less than the predetermined set magnitude in the room warming mode of operation so as to lower a set magnitude to a thermostat for warming water; and a seventh means for sensing an outdoor temperature and a cooling/warming water temperature during the suspension of the operation of the air conditioner and for operating the pump and for suspending the operation of the pump when the water temperature becomes not less than the predetermined set magnitude after the operation of the pump for a predetermined time interval in order to prevent the pump and its associated water piping from freezing.

BRIEF DESCRIPTION OF THE DRAWINGS

The present invention will become more readily apparent from the following detailed description taken in conjunction with the accompanying drawings in which:

FIG. 2 is a flow chart for programming the operation of the arrangement shown in FIG. 1, wherein

FIG. 4 is a flow chart for programming the operation of the arrangement shown in FIG. 3, wherein

DESCRIPTION OF THE PREFERRED EMBODIMENTS

Figure 1:
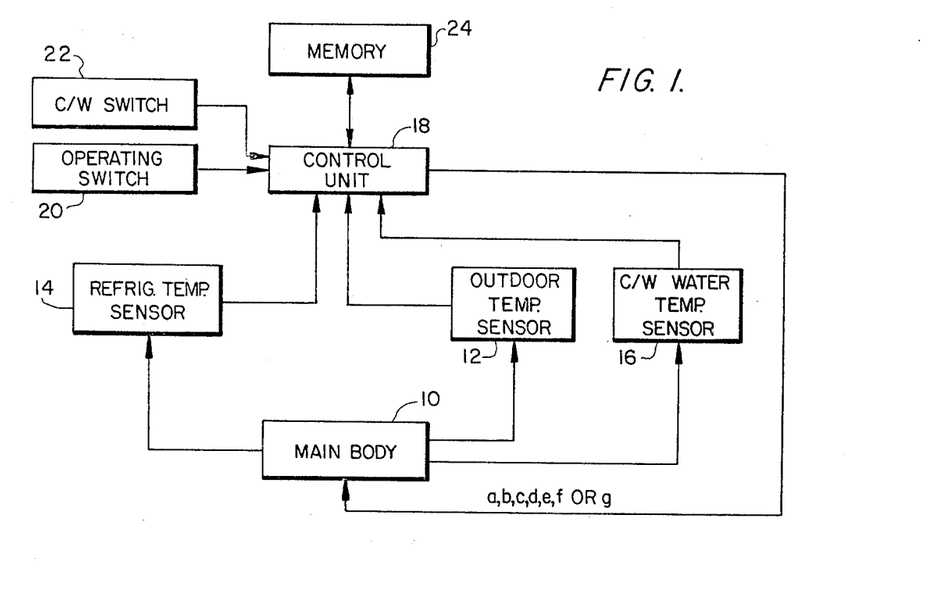
FIG. 1 is a block diagram of one embodiment of an air conditioner according to the present invention.

Referring to FIG. 1 of the drawings, there is illustrated one embodiment of an air conditioner according to the present invention. The illustrated arrangement comprises the main body 10 of an air conditioner which is similar in construction to that of a conventional air conditioner and includes a plurality of ventilating fans, a plurality of refrigerant compressors, a cooling/warming water pump, and a plurality of air coils, although those components are not illustrated for purpose of simplicity. The main body 10 is connected to an outdoor temperature sensor 12, a refrigerant temperature sensor 14 and a cooling/warming water temperature sensor 16. Each of the sensors is formed of a thermistor which is responsive to a change in temperature so as to vary its resistance. All of the sensors 12, 14 and 16 are connected to a control unit 18 to which an operating switch 20 and a cooling/warming switch 22 are connected. Furthermore, the control unit 18 is connected to a memory 24 so as to control the components disposed in the main body 10 of the air conditioner by using data which has been preliminarily stored in the memory 24 and date which is newly entered into the memory 24 by the control unit 18.

As shown in FIG. 1, the control unit 18 can selectively supply a signal a to the main body 10 for successively starting the pumps, fans and compressors, a signal b for operating the compressors in a rotational manner, a signal c for selecting the number of the compressors put in operation, a signal d for performing the defrosting operation, a signal e for operating the pump to prevent the freezing thereof during the winter season, a signal f for controlling the number of fans put in operation and a signal g for performing the defrosting operation during the suspension of operation of air conditioner during the winter season.

When the operating switch 20 is put in its ON position, the control unit 18 supplies the signal a to the main body 10 so to successively start the fans and compressors at time intervals which have been preliminarily stored in the memory 24. When the operation continues, the temperature of cold/warm water is changed in accordance with loading and is sensed as a variation in resistance by the water temperature sensor 16. The control unit 18 compares the varied resistance value with a reference resistance value stored in the memory 24 and responds to the result of the comparison so as to suspend the operation of a required number of compressors.

Upon this suspension of the operation of the compressors, heat is consumed on the load side so as to change the water temperature, resulting in the necessity of again operating a number of compressors. With the load side suddenly changed, the now non-operating compressor or compressors may be immediately operated. Thus, the control unit 18 supplies a signal b to the main body 10 so as to prevent the non-operating compressor or compressors from restarting during a suitable time interval.

Also, when the compressor or compressors is or are non-operating, the control thereof in the same pattern results in a difference in the operating time interval between each of the compressors. In order to thus avoid the difference in the operating time intervals, the control unit 18 supplies the signal c to the main body 10 so that, upon suspending the operation of one or more of the compressors, the operation of that compressor or compressors put placed in operation for the longest time interval or intervals is or are suspended and, upon the of the air conditioner, that compressor or compressors whose operation has been suspended for the longest time interval or intervals is or are re-started.

In operation, the outdoor temperature is always sensed by the outdoor temperature sensor 12 and entered in the control unit 18. The control unit compares the sensed temperature with a reference temperature stored in the memory 24 upon a decrease in the outdoor temperature during the room cooling mode of operation and upon a rise of the outdoor temperature during the room warming mode of operation. The control unit 18 then supplies the signal f to the main body 10 in response to the result of the comparison so as to control the number of fans placed in operation.

In the room warming mode of operation, the outdoor and refrigerant temperature sensors 12 and 14 always respectively sense the associated temperatures and enter the sensed temperatures into the control unit 18. The control unit 18 then determines if frost is attached to the air coils in accordance with a calculation expression stored in the memory 24 and when having determined so, the control unit 18 supplies the signal d or g to the main body 10 as the case may be so as to perform the defrosting operation.

The operating switch 20 may be put in its OFF position during the room warming mode of operation and the OFF position of the switch 20 entered into the control unit 18. At that time, the control unit 18 controls the main body 10 so that its operation is suspended after the completion of the defrosting operation.

During the suspension of operation of the main body 10, the outdoor and water temperature sensors 12 and 16 always respectively sense the associated temperatures and supply the sensed temperatures to the control unit 18. The control unit 18 always compares the sensed temperatures with associated reference temperatures stored in the memory 24 so as to control the pumps so as to be operated upon a decrease in the outdoor and water temperatures and suspended upon the rise of the latter temperatures. This control is effected by the signal e.

Figure 2A:
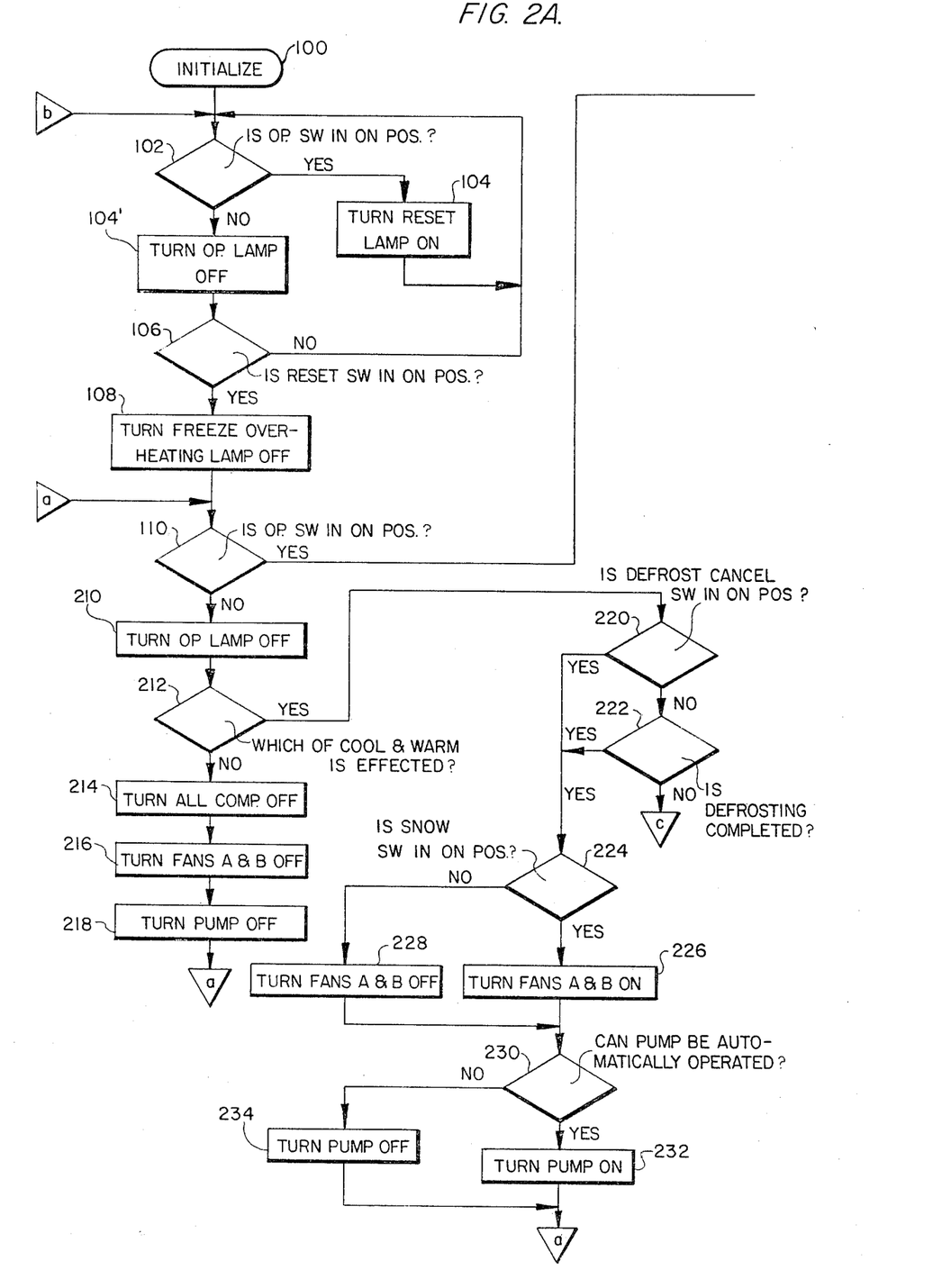
FIGS. 2A, 2B, 2C and 2D are respectively four portions into which the flow chart is divided
Figure 2B:
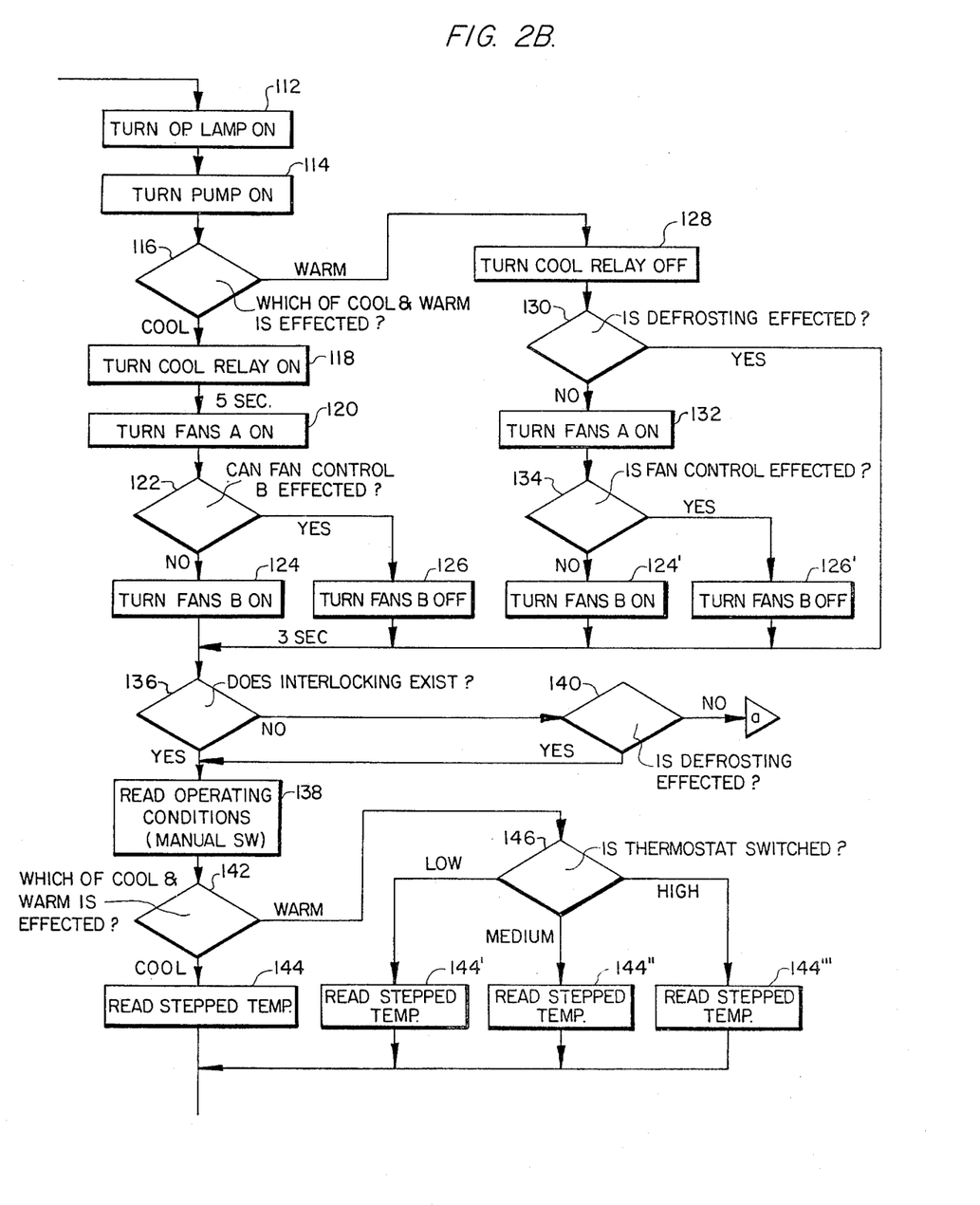
Figure 2C:
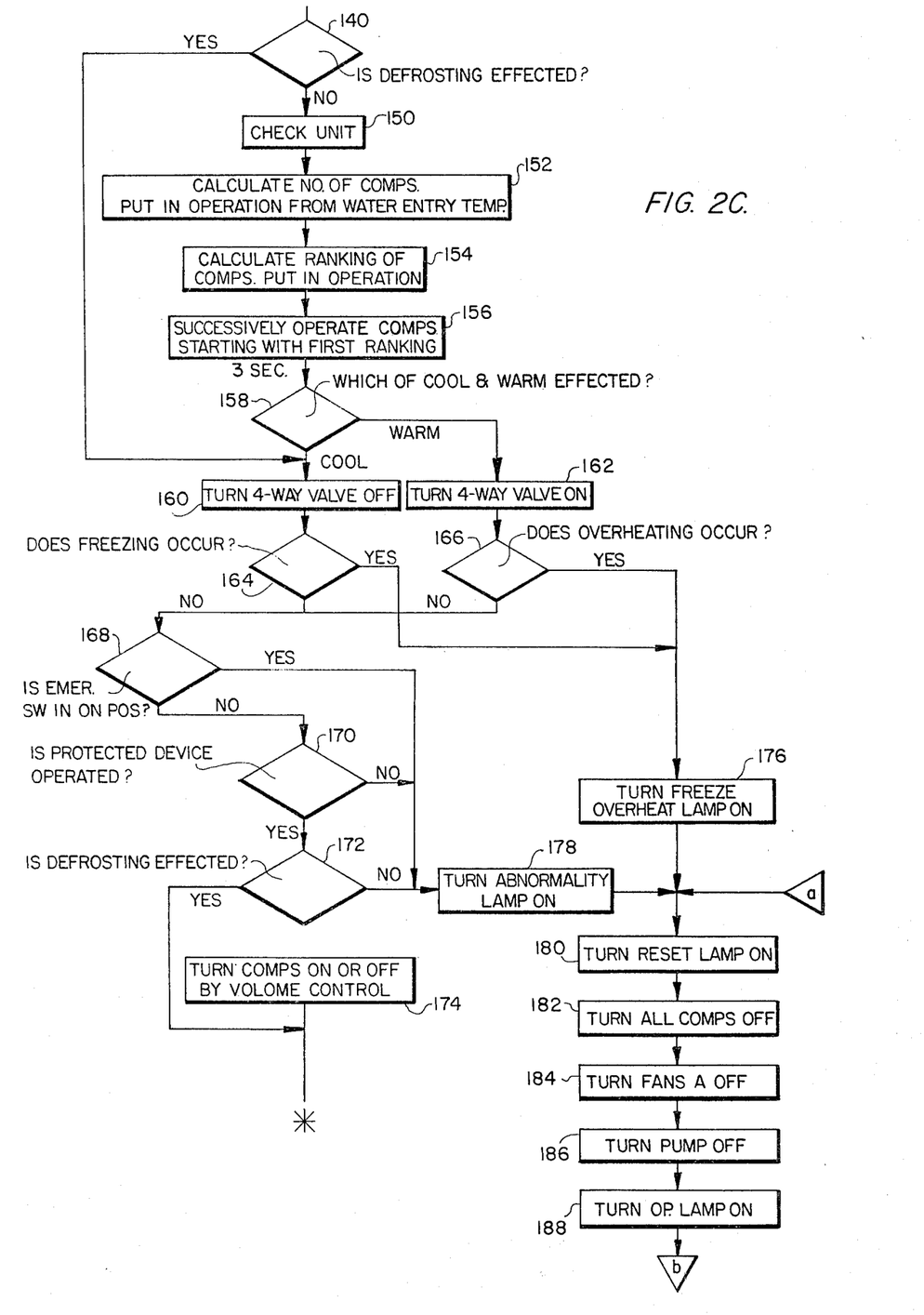
Figures 2D, 2E:
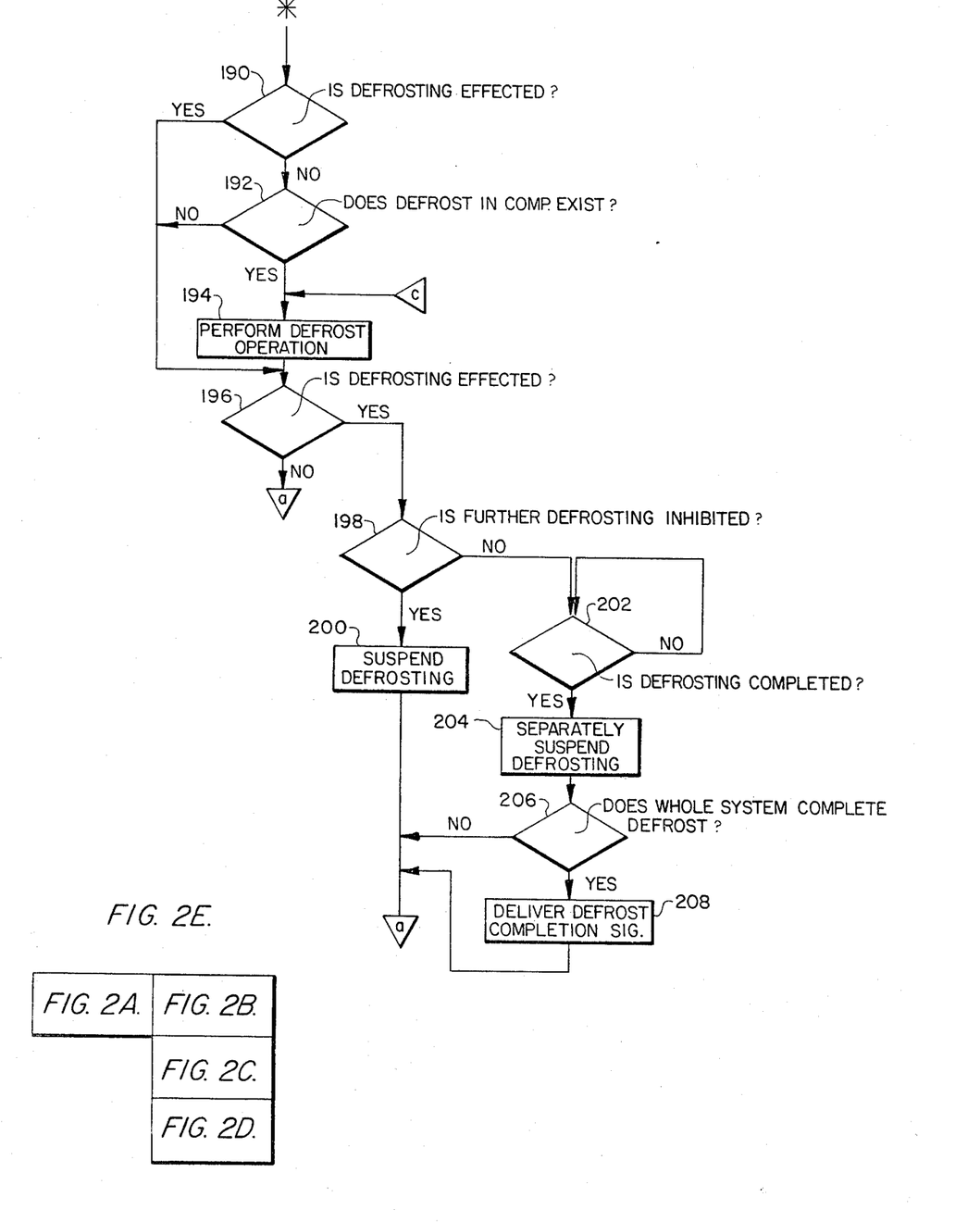
FIG. 2E shows the arrangement of FIGS. 2A, 2B, 2C and 2D.

Assuming that the plurality of fans are divided into two fan blocks A and B, the operation of the arrangement shown in FIG. 1 will now be described in more detail in conjunction with FIG. 2, wherein there is illustrated a flow chart for programming the operation of the arrangement divided into four portions shown in FIGS. 2A, 2B, 2C and 2D respectively which are, in turn, arranged as shown in FIG. 2E.

In the step 100 shown in FIG. 2A, a microcomputer (not shown) which is disposed in the control unit 18 is initialized. That is, the microcomputer is supplies with electric power so as to be ready for executing the program and has been placed in its reset state. Then, step 102 determines if the operating switch 20 is in its ON position.

When the operating switch 20 is in its ON position, as determined in step 102, the step 104 is entered to turn a resetting lamp on, after which the program is returned back to step 102. The resetting lamp continues to be in its ON position until the operating switch is turned OFF.

When the operating switch 20 is in its OFF position, as determined in step 102, an operating lamp is turned off in step 104' followed by the entry of step 106. Step 106 determines if a resetting switch is in its ON position, and if not, step 102 is again entered. The operating switch 20 is also used as the resetting switch and in its OFF position resets the microcomputer and turns the resetting switch on. When the resetting switch is not in its ON position and therefore the operating switch is in its ON position, the program is returned back to step 102 and does not proceed forward.

On the other hand, when the resetting switch is in its ON position, as determined in step 106, a freeze overheating lamp is turned off in step 108.

The process starting with the step 100 and terminating at step 108 is effective for preventing the air conditioner from being operated at its discretion upon the supply of electric power to the microcomputer when the operating switch 20 is in its OFF position.

Then, step 110 is entered to determine if the operating switch is in its ON position. When the operating switch is in its ON position, as determined by step 110, step 112 is entered as shown in FIG. 2B in which the operating lamp is turned on, so as to indicate that the air conditioner has been started. Then, the cooling/warming water pump is turned on in step 114. Thereafter, step 116 is entered to determine which of cooling and warming is to be effected. When the room cooling mode is determined by the position of the cooling/warming switch 22 disposed on an operating board of the air-conditioner or on a substrate for the microcomputer, step 118 is entered to energize a cooling relay on the substrate for the microcomputer.

Upon the lapse of five seconds after the cooling relay has been turned on, a fan block A is turned on in step 120. The air conditioner includes a plurality of fans, in this case, divided into two blocks A and B. The fan block A is necessarily operated when the operating switch 20 is in its ON position. However, the fan block B is operated in accordance with an outdoor temperature so that its operation is suspended at excessively low outdoor temperatures in the room cooling mode of operation and also at excessively high outdoor temperatures in the room warming mode of operation. The operation of the fan block B as described above is called hereinafter the fan control which controls the flow rate of the air delivered from the fans.

Then, step 122 determines if the fan control is to be effected in the room cooling mode operation. When the fan control is not effected in the room cooling mode of operation, as determined in step 122, the fan block B is turned on in step 124. Otherwise, the fan block B is turned off in step 126.

If the room warming mode of operation is determined in step 116, then step 128 is entered to turn the cooling relay off.

Subsequently, step 130 is entered. Since defrosting may be effected in the room warming mode of operation, step 130 determines if defrosting is to be effected because, operation of the fans must be suspended during defrosting. When step 130 determines that defrosting is not to be effected, step 132 is entered to turn the fan block A on.

Following this, step 134 determines if the fan control is to be effected in the room warming mode of operation. When so determined, the fan block B is turned off in step 126' and otherwise, the fan block B is turned on in step 124'.

At the end of three seconds after the fan block B has been turned on or off in steps 124 and 124' and 126', respectively the program goes to step 136 where it is determined if the interlocking exists. The interlocking includes a pump interlocking corresponding to a series connection of a contacts of pump connectors and a fan interlocking corresponding to a series connection of a contacts of fan connectors. Those series connections are entered into the microcomputer. When the interlocking exists as determined in step 136, the operating conditions are read out in step 138. That is, manual switches are selectively operated because a plurality of refrigerant compressors are selectively operated and their operation suspended by means of the manual switches, one for each compressor. On the other hand, when the interlocking does not exist, as determined in step 136, step 140 determines if defrosting is to be effected. This is because the operation of the fans are suspended during defrosting and therefore the fan interlocking does not exist. When the defrosting is to be effected, as determined in step 140, the program goes to step 138 as described above, even though no interlocking exists. On the other hand, when the defrosting is not to be effected in the absence of the interlocking, the program can not go forward until the interlocking occurs. That is, the program is returned back to step 110 as shown by the reference charactor a in a triangle in FIGS. 2A and 2B.

Then, step 142 determines which of the cooling and warming is to be effected. When the room is to be cooled as determined in step 142, a stepped temperature is read out in step 144. That is, step 144 reads out a predetermined set temperature in order to effect the volume control by performing the ON/OFF operation of the compressors. On the other hand, when the room is warmed, step 142 is followed by step 146 where a set position of a thermostat is investigated. The thermostat has a low, a medium and a high position. Even though the thermostat has switched to one of those three positions, step 144 is repeated. After the stepped temperature has been read in step 144, step 148 determines if the defrosting is effected. When step 148 gives an answer "NO," step 150 checks the unit. In other words, when cold or warm water has a temperature which has reached the stepped or set temperature read out in step 144, the compressors which are in operation are successively stopped in a predetermined order. Following this, step 152 calculates the number of the compressors put in operation from an entry temperature of cooling water. Then, step 154 calculates the ranking of the compressors which are to be put in operation for the purpose of controlling a volume of cooling water. Then, step 154 is followed by step 156 where the compressors are successively operated at time intervals of three seconds, starting with the compressor having the first rank as determined in step 154.

Then, step 158 determines which of the cooling and warming is to be effected. When the room is to be cooled, as determined in step 158, a four-way valve is turned off in step 160 to establish a room cooling circuit in accordance with a command from the microcomputer in step 160. Otherwise, the four-way valve is turned on to change the room cooling circuit to a room warming circuit in step 162.

When step 148 gives a "YES" answer, step 160 is then effected.

In the room cooling mode of operation, step 164 determines if the water temperature is excessively low so as to freeze water; in the room warming mode of operation, the step 166 determines if the water temperature is excessively high so as to overheat water. When either steps 164 or 166 gives a "NO" answer, step 168 determines if an emergency stopping switch is in its ON position. When that switch is in its OFF position, as determined in step 168, step 170 investigates whether or not a protective device is operated. When the protective device is operated, as determined in step 170, step 172 determines if the defrosting is to be effected. When the defrosting is not effected, as determined in step 172, step 174 turns the compressors on or off in accordance with volume control. Step 174 is then followed by step 190 to be described later.

When either step 164 or 166 gives a "YES" answer, the freeze overheating lamp is fired in the step 176.

Also, when the protective device is not operated, as determined in step 170, or when the defrosting is not to be effected, as determined in step 172, an on abnormality lamp is turned on in step 178, after which the resetting lamp is turn on in step 180. Step 176 also goes to step 180. Thereafter, the compressors in this case, three compressors, the fan blocks A and B, the pump and the operating lamp are successively turned off in steps 182, 184, 186 and 188, respectively. As shown by the reference character b in a triangle in FIGS. 2C and 2A, the program is returned back to step 102 from step 188.

When the step 172 gives a "YES" answer, the system continues to step 190 shown in FIG. 2D as illustrated by the asterisk in FIGS. 2C and 2D. Also, step 174 goes to step 190. Step 190 again determines if a chiller for an air cooling heat pump is in the defrosting mode of operation or if the defrosting is effected. When the defrosting is not to be effected, as determined in step 190, step 192 determines if the conditions for entering the defrosting operation exists. When so determined, the defrosting operation is performed in step 194. Thereafter, step 196 also determined if the defrosting is effected. Step 196 determines if the defrosting is effected even when the defrosting is effected as determined in step 190 or when no condition for entering the defrosting operation exists, as determined in step 192.

When the defrosting is to be effected, as determined in step 196, step 198 again determines if the defrosting is still effected. If the defrosting is to be not effected, as determined in step 196, the program is returned back to step 110 as shown at the reference character a in a triangle in FIGS. 2A and 2D.

When the defrosting is still to be effected, as determined in step 196, step 198 determines if the defrosting is to be inhibited from continuing. The conditions for inhibiting the defrosting includes the defrosting is completed within a predetermined time interval and that the water temperature does not decrease to a predetermined magnitude. When the conditions for inhibiting the defrosting are met as determined in step 198, step 200 suspends the defrosting operation, after which the program is returned back to the step 110 as shown by the reference character a in a triangle in FIGS. 2A and 2D.

When the continuation of the defrosting is not to be inhibited, as determined in step 198, step 202 determines if the defrosting is completed. When so determined, step 204 successively suspends the defrosting starting with that refrigerant circuit having completed the defrosting. Then step 206 determines if all of the refrigerant circuits have completed the defrosting. When so determined, step 208 delivers a signal for the completion of the defrosting, after which the program is returned back to step 110 as shown by the reference character a in a triangle in FIGS. 2A and 2D.

If all the refrigerant circuits do not complete the defrosting, as determined in step 206, then the program is similarly returned back to step 110.

Referring back to FIG. 2A, it is assumed that the operating switch is not in its ON position, as determined in step 110. Under the assumed conditions, the operating lamp is turned off in step 210. Thereafter, step 212 determines which of the cooling and warming is to be effected. When the room is to be cooled, as determined in step 212, all of the compressors, the fan blocks A and B and the pump are successively turned off in steps 214, 216 and 218, respectively. Subsequently the program is returned back to step 110 as shown by the reference character a in a triangle in FIG. 2A.

When step 212 determines that the room is to be warmed, or that the cool/warm switch is in its warming position, step 220 determines if an on-suspension defrosting cancelling switch is in its ON position. That switch is operative to perform the defrosting operation during the suspension of operation of the air conditioner in the room warming mode of operation and is provided for cancelling the room warming mode of operation.

When the on-suspension defrosting cancelling switch is not in its ON position, as determined in step 220, step 222 determines if the defrosting during the suspension in the room warming mode of operation is completed in order to perform the defrosting operation during that suspension of operation.

When the defrosting is not completed, as determined in step 222, step 194 (see FIG. 2D) is entered as shown by the reference character c in a triangle in FIGS. 2A and 2D. Then, the defrosting operation is performed following steps 194 through 208.

When the no-suspension defrosting cancelling switch is in its ON position, as determined in step 220, or when the defrosting is completed, as determined in the step 222, the defrosting is not required. Thus, step 224 determines if a snow switch is in its ON position after the completion of the defrosting during the suspension of operation in the room warming mode of operation. When so determined, step 226 turns the fan blocks A and B on. Only in the ON position of the snow switch, can the fans be operated even when the operating switch in its OFF position. Thus, the fans can be prevented from freezing because their blades are not snowed on in their in operative state.

On the other hand, when the snow switch is not in its ON position, as determined in step 224, step 228 turns the fan blocks A and B off. In areas of low snowfall, the snow switch may be put in its OFF position so as to prevent the fans from being uselessly operated.

Following this, step 230 determines if the pump is automatically operated. In order to prevent the pump from freezing during the suspention in the room warming mode of operation, an automatic pump operating mechanism is provided and is operative to automatically operate the pump in response to a decrease in either of an outdoor temperature or a water temperature down to a predetermined magnitude and to automatically suspend the operation of the pump in response to an increase in water temperature to the predetermined magnitude after the initiation of the operation thereof and at the end of a predetermined operating time. When the pump is automatically operated, as determined in step 230, step 232 turns the pump on. Otherwise, step 234 turns the pumps off.

Thereafter, the program is returned back to step 110 as shown by the reference character a in a triangle in FIG. 2A.

Figure 3:
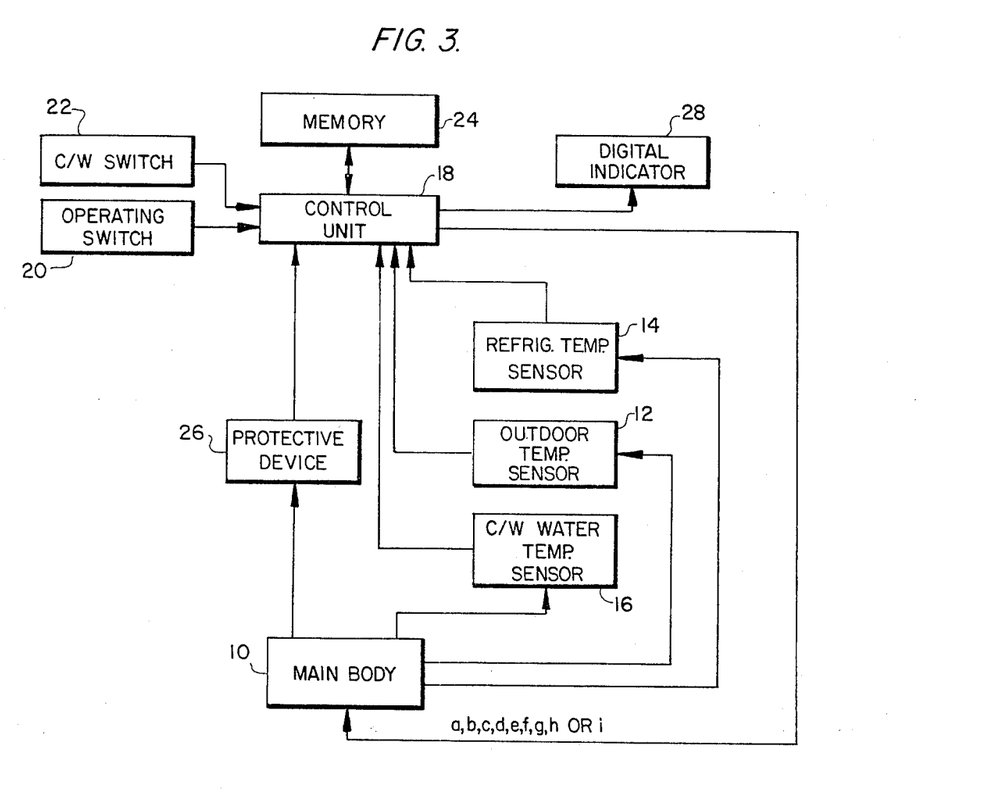
FIG. 3 is a block diagram of a modification of the present invention.

Refering now to FIG. 3, there is illustrated a modification of the present invention. The illustrated arrangement is different from that shown in FIG. 1 only in that in FIG. 3, a protective device 26 is shown as being connected between the main body 10 and the control unit 18 which is, in turn, connected to a digital indicator 28. The protective device 26 may comprise a high pressure switch, a low pressure switch, or an overcurrent relay and is provided for each of the compressors, the fans, the electric motors for the compressors and fans, etc. The digital indicator indicates thereon the operating status of the main body 10 with characters and numerals.

The control unit 18 selectively supplies, in addition to the signals as described above in conjunction with FIG. 1, a signal h for digitally indicating the operating modes and the failure mode and a signal i for sensing an outdoor temperature and for shifting a thermostat for cooling/warming water in accordance with the sensed outdoor temperature with the signals c and f combined together into a single signal.

Figure 4A:
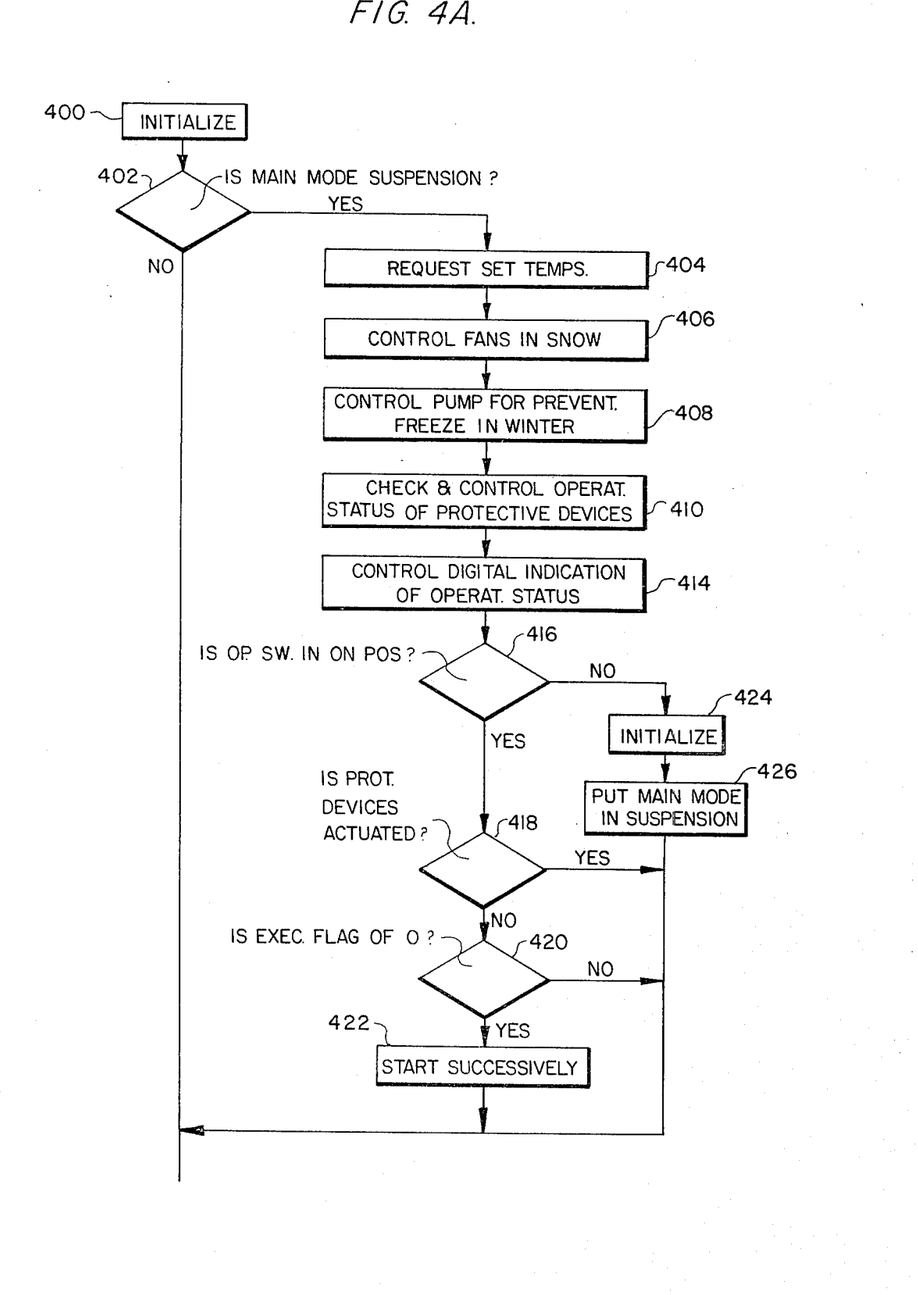
FIGS. 4A, 4B and 4C are respectively three portions into which the flow chart is divided
Figure 4B:
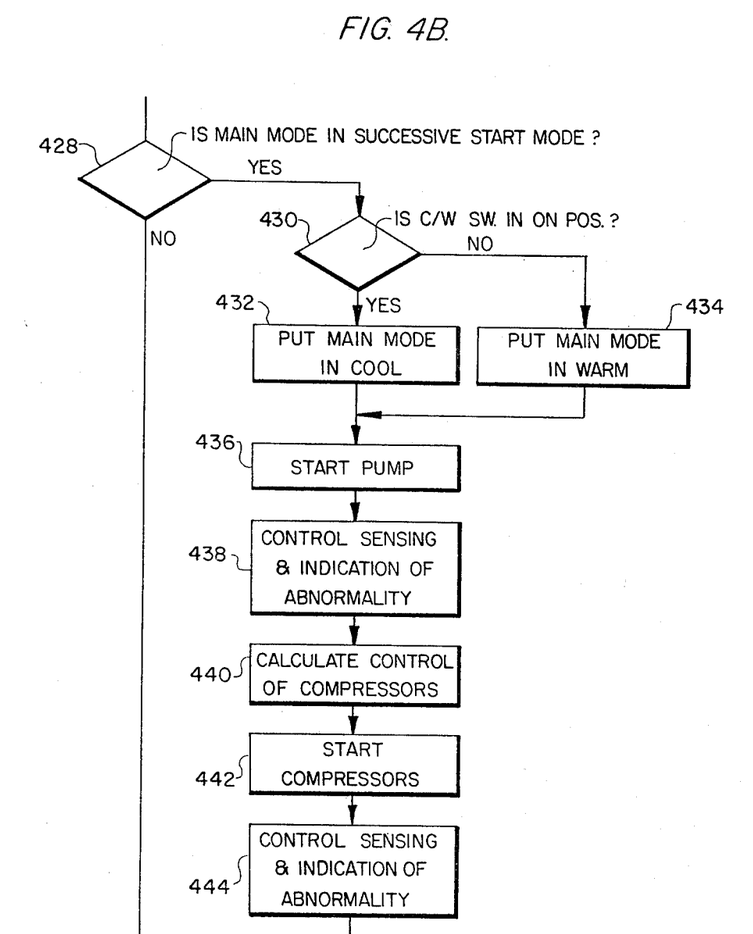
Figure 4C:
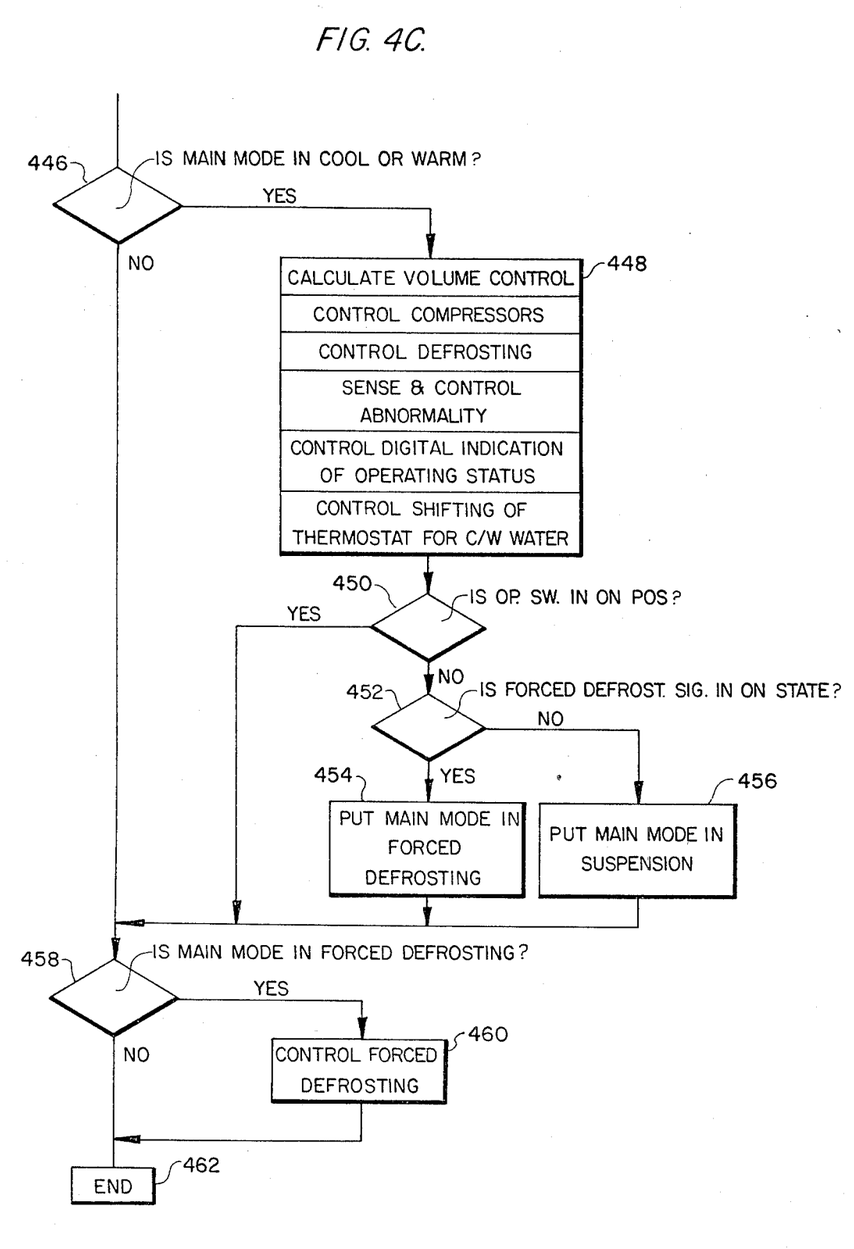
Figure 4D:
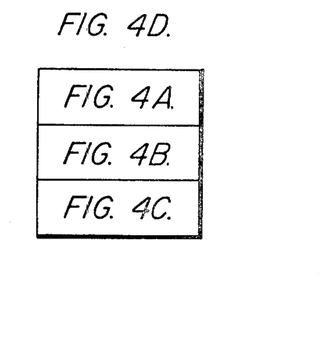
FIG. 4D shows the arrangement of FIGS. 4A, 4B and 4C.

The operation of the arrangement shown in FIG. 3 will now be described in conjunction with FIG. 44 wherein there is illustrated a flow chart for programming the operation thereof divided into three portions shown in FIGS. 4A, 4B and 4C respectively which are, in turn, arranged as shown in FIG. 4D.

In step 400 shown in FIG. 4A, the microcomputer is initialized. That is, the microcomputer is ready for executing the program in the microcomputer. Then, step 402 determines if the main mode is the suspension of operation mode.

When so determined, or when the operating switch 20 is in its OFF position, (not shown) various set temperatures are requested in step 404, after which the following control operations are successively performed in the suspension of operation mode:

(1) Control of Fans in Snow.

When the air conditioner is in the suspension of operation mode in the winter season or the operation of the fans is suspended due to the volume control, the fans and the associated components are snowed on so as to freeze. Upon the starting of the, electric motors for the fans, the motors may overheat due to their locked up condition. In order to prevent this overheating, a signal from a snow switch or a snow sensor is supplied to the control unit 18 to control the operation of the fans.

(2) Control of pump to preventing freezing winter season.

As described above, the sensed outdoor temperature and water temperatures from the temperature sensors 12 and 14 are always supplied to the control unit 18 where the sensed temperatures are compared with associated reference magnitudes stored in the memory 24. When the outdoor temperature and water temperature decrease, the pump is operated and then its operation suspended upon a rise of the water temperature due to the operation thereof for some time interval under the control of the control unit 18. This results in the pump and associated piping being prevented from freezing.

3. Check and Control of Operating Status of Protective Devices.

When the main body 10 is in the suspension of operation mode and in operation, the protective devices 26 supply data to the control unit 18 and may sense an abnormality or abnormalities. Then, the control unit 18 delivers a command signal for suspending the operation of an associated component or components.

(4) Control of Digital Indication of Operating Status.

The operating switch 20, the cooling/warming switch 22, the protective devices 26 and the water temperature sensor 16 supply the signals to the control unit 18 so that the operating status is indicated on the indicator 28 in accordance with the number of the signals supplied to the control unit 18. For example, the normal suspension of operation is indicated as "IN SUSPENSION." When the main body 10 is put in operation, the indicator 28 indicates "IN ENERGY-SAVING-OPERATION" thereon. Also, when any of the protective devices 28 is actuated with the main body 10 having its operation suspended or operated, the indicates 28 indicaters, for example "ACTUATION UNDER LOW PRESSURE" thereon.

The controls as described above are effected in the named order in the steps 406, 408, 410, and 414 respectively.

Subsequently, step 416 determines if the operating switch is in its ON position. When so determined step 418 determines if the protective devices are actuated. When step 418 determines that the protective device or devices is or are not actuated, step 420 determined if an execution flag is a ZERO. When so determined step 422 successively starts the pump, fans and compressors at predetermined time intervals which have been preliminarily stored in the memory 24.

When the operating switch is not in its ON position, as determined in step 416, step 424 keeps the microcomputer in its initialized state. Then, the step 426 puts the main mode in the suspension of operation mode.

When the protective device or devices is or are actuated as determined in step 418, it is decided that the present suspension of operation mode results from the actuation of the protective device or devices.

When the step 402 gives a "NO" answer, step 418 or 420 give respective "YES" or "NO" answers, then step 428 is entered (see FIG. 2B). Step 422 or 426 also continues to step 428. Step 428 determines if the main mode is the successive start mode. When so determined step 430 determined which of the cooling and warming is to be effected. When the room is to be cooled, as determined in step 430, step 432 sets the main mode to the room cooling mode. Otherwise, step 434 sets the main mode to the room warming mode.

Following this, the pump is started in step 436 and then step 438 senses an abnormality or abnormalities and indicates the operating status on the indicator 28. Subsequently, step 440 calculates the manner in which the cmpressors is controlled as follows:

(a) a calculation of the number of the compressors put in operation from the sensed water temperature;
(b) a calculation of the ranking of the compressors put in operation;
(c) a calculation of the volume control in order to prevent the overloaded operation of the compressors upon the start in the room cooling mode of operation; and
(d) a calculation of the volume control for the purpose of preventing the low pressure switch from being operated due to an abnormal reduction in evaporating pressure upon the start in the room warming mode of operation.

Then, step 442 successively starts the compressors with the calculated rankings after which step 444 repeats the process in the step 438.

When the step 428 gives a "NO" answer, step 446 is entered (see FIG. 4C). Also, step 444 goes to step 446 where it is determined if the main mode is the room cooling or warming mode. When so determined, step 448 is entered. The step 448 calculates the volume control for the following reasons: The control unit 18 is responsive to the sensed water temperature as described above so as to effect the ON-OFF control of the compressors and electromagnetic valves used with the volume control and simultaneously the ON-OFF control of the fans. Step 448 also controls the compressors and fans so as to be operated in their rotational manner as described above and the defrosting operation. In the room warming mode of operation, the sensed temperature and water temperature as described above are always supplied to the control unit 18 which, in turn, senses a frost attached to the air coil in accordance with a calculating expression stored in the memory 24 with the result that the control unit controls the defrosting operation.

With a refrigerant circuit divided into a plurality of circuit sections, it is assumed that the plurality of circuit sections have been sensed to be simultaneously frosted. Under the assumed conditions, that circuit section operated for the longest time interval is first defrosted while the remaining circuit sections stand by. When the circuit section first defrosted has been completely defrosted, another circuit section is defrosted after a predetermined time interval. In this way, the remaining circuit sections are defrosted in succession.

When it is sensed that the plurality of circuit sections has been successively frosted at any time interval the defrosting operation is performed starting with that circuit section first defrosted. If it is sensed that another circuit section has been defrosted in the abovementioned defrosting operation and the defrosting conditions are, then the last-mentioned circuit circuit section stands by until the defrosting operation is completed with that circuit section first. At a predetermined time interval after the completion of that defrosting operation, the standby circuit section is defrosted.

The sensing and control of an abnormalily or abnormalities effected in step 448 is such that when any of the protective devices disposed on the compressors and fans is actuated, the main body 10 operation is immediately suspended. Also, the microcomputer includes a program which is responsive to a temperature which is not less than or not higher than a predetermined magnitude to suspend operation of the main body 10. Furthermore, the protective device is disposed on each of the plurality of refrigerant circuit sections and when any of the protective devices is actuated, only its mating circuit section operation is suspended with the remaining sound circuit sections continued to be operated. In addition, step 448 repeats the process in step 414 and controls an automatic shifting of a thermostat for cooling/warming water. In normal operation, the indicator 28 indicates thereon the serial number of the compressor put in operation and also the sequence in which the compressors are operated. When one of the protective devices is actuated, the name thereof is indicated in a flickering manner on the indicator 28. Also, when a plurality of the protective devices are actuated, the names thereof are indicated on the indicator one after another.

The control unit 18 controls the automatic shifting of the thermostat so that in the room warming mode of operation, the thermostat is responsive to an outdoor temperature which is not less than a predetermined magnitude so as to shift a temperature set thereto to be decreased by five degrees in centigrade as compared with a magnitude set on the thermostat at outdoor temperatures not higher than a predetermined magnitude and in the room cooling mode of operation, the thermostat is responsive to an outdoor temperature not higher than the predetermined magnitude so as to shift a temperature set thereto to be increased by two degrees in centrigrade as compared with a magnitude set to the thermostat at outdoor temperatures not less than the predetermined magnitude. This control is arranged to be disabled with an external signal which does not originate from the microcomputer.

The next succeeding step 450 determines if the operating switch is in its ON position. When the operating switch is not in its ON position, as determined in step 450, the step 452 determines if an external forced defrosting signal in its ON state. When so determined, step 452, puts the main mode in the forced defrosting mode. Otherwise step 456 puts the main mode in the suspension of operation mode. Thereafter, step 458 determines if the main mode is the forced defrosting mode. When so determined, the forced defrosting is controlled in step 460 after which the program is ended in step 460. When step 458 gives a "NO" answer, the program is also ended in step 460.

From the foregoing it is seen that the present invention provides an air conditioner which is controlled by both a control unit without contacts and a memory. Thus, the present invention is advantageous in that the control unit malfunctions less and the control accuracy is increased, resulting in products having a high quality. Furthermore, in the modification of the present invention shown in FIG. 3, the operating status can readily be handled because the digital indicator indicates the status with characters and numerals. Also, the air conditioner has the protective control for the components easily incorporated thereinto resulting in an increase in control accuracy.

While the present invention has been illustrated and described in conjunction with a few preferred embodiments thereof, it is to be understood that numerous changes and modifications may be resorted to without departing from the spirit and scope of the present invention.

What is claimed is:

1. An air conditioner comprising: a main body including a plurality of ventilating fans, a plurality of refrigerant compressors and a cooling/warming water pump; a first means for successivley starting said plurality of ventilating fans and said plurality of refrigerant compressors; a second means for sensing a cooling/warming water temperature, and for effecting a volume control by changing the number of said plurality of compressors which are in operation in accordance with said sensed water temperature and for controlling the rotational operation of said plurality of compressors in order to minimize differences in operating times of said plurality of compressors due to the volume control so as to thereby prevent said plurality of compressors from being operated in short cycles; a third means for sensing an outdoor temperature and for changing the number of said plurality of ventilating fans which are in operation in response to said sensed outdoor temperature; a fourth means for sensing if frost is attached to an air coil means by sensing both an outdoor temperature and a refrigerant temperature and for completing a defrosting operation; a fifth means which is responsive to a command suspension signal to suspend the operation of said air conditioner after the completion of said defrosting operation; and a sixth means for sensing an outdoor temperature and a cooling/warming water temperature during said suspension of operation of said air conditioner and for operating and suspending said pump in response to said sensed temperatures so as to thereby prevent said pump and its associated water piping from freezing.

2. An air conditioner comprising: a main body including a plurality of ventilating fans, a plurality of refrigerant compressors and a cooling/warming water pump; a first means for successively starting said plurality of ventilating fans and plurality of refrigerant compressors; a second means for sensing a cooling/warming water temperature and for controlling the rotational operation of said plurality of refrigerant compressors and said plurality of ventilating fans by changing the numbers of said plurality of compressors and fans which are in operation in accordance with said sensed water temperature in order to minimize differences in operating times of said plurality of compressors and fans due to a volume control so as to thereby prevent said plurality of compressors and fans from being operated in short cycles; a third means for sensing if frost is attached to an air coil means by sensing both an outdoor temperature and a refrigerant temperature and having a plurality of refrigerant circuits to complete the defrosting operation; a fourth means which is responsive to a command suspension signal to suspend the operation of said air conditioner after the completion of said defrosting operation; a fifth means for digitally indicating modes in which said air conditioner is being respectively operated and for indicating a failure mode of said air conditioner; a sixth means for sensing an outdoor temperature, said sixth means being responsive to an outdoor temperature which is not higher than a predetermined set magnitude during a room cooling mode of operation so as to shift a set magnitude of a thermostat for cooling water to increase at will and being responsive to an outdoor temperature which is not less than the predetermined set mangitude during a room warming mode of operation so as to shift a set magnitude of a thermostat for warming water to decrease at will; and a seventh means for sensing both an outdoor temperature and a cooling/warming water temperature during said suspension of operation of said air conditioner and operating said pump so as to prevent said pump and associated water piping from freezing and for suspending operation of said pump when said outdoor temperature becomes not less than said predetermined set magnitude after the operation of said pump for a constant time interval.

* * * * *